UNITED STATES PATENT OFFICE.

ANDREAS FENGER-GRÖN, OF HELLERUP, DENMARK.

PROCESS OF MANUFACTURING INSULATING-BODIES OF "MOLER."

1,338,566.  Specification of Letters Patent.  Patented Apr. 27, 1920.

No Drawing.  Application filed March 29, 1919. Serial No. 286,088.

*To all whom it may concern:*

Be it known that I, ANDREAS FENGER-GRÖN, of Strandvej 136, Hellerup, in the Kingdom of Denmark, a citizen of the Kingdom of Norway, have invented certain new and useful Improvements in Processes of Manufacturing Insulating Bodies of "Moler", of which the following is a specification.

The invention consists in a process of manufacturing insulating bodies of "moler", which is a heavy diatomaceous rock found only in Denmark and containing about from ten to twenty per cent. of metallic oxids, chiefly alumina and peroxid of iron, but composed of diatoms for the most part. Insulating bodies for insulating walls, ceilings, floors, pipes, vessels and the like against the passage of heat and cold are at present manufactured from silicious earth, burned clay, cork and many other both organic and inorganic substances. As the chief characteristic feature of the materials may be stated that the inorganic substances are fire-proof and sterile, but heavy and not sufficiently insulating, while the organic substances on the contrary are light and insulate to satisfaction, but on the other hand are inflammable and assailable by microörganisms.

The present invention removes these drawbacks, as the same relates to the manufacture of an insulating material of "moler", the same material being satisfactorily insulating, fire-proof, light and sterile and at the same time very cheap to manufacture. It has been tried to manufacture insulating bodies from "moler" by mixing the clay with other especially organic substances, afterward molding and burning it. Serviceable insulating bodies are hereby obtained; the method is however objectionable as a great number of the bodies will be broken by the burning on account of the expansion of the added organic substances. This loss is reduced by the present invention. Before the organic substances are mixed with the clay, they are brought into such a state, that the expansion by the burning will be quite inconsiderable, so that it does not hurt the insulating bodies.

The "moler", which is applied in dry state consists chiefly of about 75% silica, about 7% iron, about 8% alumina and about 7% water together with quite small quantities— altogether about 3%—of other substances.

The process of manufacture is the following:

The "moler" is in dry state ground to a fine powder and thereafter mixed with an organic substance in granulous or gritty state. The organic substance may be dressed cork, peat, sawdust or the like. Of especial importance is it that the organic grains or grit must be of about the same size. As to cork, which is the best material for this use, the single grains have a size of about 2 mm. in diameter and the proportion of the component parts is three portions of cork grains to two portions of dried, ground "moler". The dressing of the organic substance consists chiefly therein that the substance after having been ground to grains of a suitable size very quickly is heated to a temperature of 150–200° C., by which heating the grains of the cork will expand and part of the air will be driven out. By the heating the volume of the cork is augmented—when the temperature has reached a height of 150–175° C.—to about double of the original volume. By further heating no increase of the volume is obtained but only a gasification. By heating the cork to 150–175° C., one obtains the advantage that for the manufacture of a certain number of insulating bodies a lesser quantity of cork corresponding with the increase of volume will be sufficient, just as the mechanical pressure, which the cork when added to the "moler" in its natural state will exercise, is completely evaded. The "moler" is itself porous, so that the gas generated may escape without difficulty and will not exercise any bursting influence on the insulating bodies during the burning.

The bursting of the insulating bodies is due only to the mechanical pressure, which the cork exercises during the heating, and this pressure is as formerly stated completely removed when the cork as stated is heated to 150–175° C., before it is added to the "moler".

After mixing "moler" and cork, water in small quantities is added under continued stirring up, until the mass has reached a doughlike consistency and can be molded. The quantity amounts to 45–60% of the weight of the finished mixture.

Bodies of desired shape are now molded or pressed from the mass, and these bodies are dried in about 3 days and nights at a temperature of about 30° C.

Afterward the bodies are burned in a muffle-furnace in the following manner:

The muffle-furnace is heated slowly to about 250° C., and the substance added to the "moler" will then be completely consumed except that it will leave a fine black powder of carbon. The furnace thereafter is heated more quickly to a temperature of about 1000° C. The charcoal powder in the pores of the bodies is then completely burnt away and leaves holes of a size of about 2 mm. in the body, the "moler" being solidly converted into a very light, stony mass having a spongy surface of fracture and a specific gravity of about 0.3.

If a highly porous stone is to be manufactured, cork forms the chief component of the mass for manufacturing the stone, and the disposition of the stone to burst during the burning is therefore very strong, unless care is taken to make the cork expand before it is added to the "moler."

As smaller quantities of cork will not have a bursting effect on the stone, and as on the other hand cork is the material which produces especially neat pores in the stone and at the same time produces the strongest stone, it becomes advisable to ascertain if it may be not possible by replacing the cork with another organic substance to avoid expansion of the cork, at the same time as a saving was obtained by replacing part of the costly cork with a cheaper material.

Experiments have proved that this is possible and that about 50% of the quantity of cork may be replaced by sawdust of suitable size and thus obtaining a product which is equal to that which is obtained by the sole use of cork.

While sawdust used alone gives a product of very loose quality which easily crumbles, the product obtained by using a mixture of cork and sawdust is very strong and durable and can only with difficulty be distinguished from a stone obtained by the sole use of expanded cork.

Instead of sawdust or together with this may also be applied other organic substances which are ground to a suitable size. Such a mixture gives a product of the same quality as by using sawdust alone together with cork; but such a mixture is as a rule somewhat dearer to use without yet being as dear as cork alone.

It will be evident that this is of great importance, as about half the quantity of cork is saved, the cork being replaced by the much cheaper sawdust, and just the same a very strong and solid product is obtained.

The manufacture of insulating stone takes place in the already known manner, only with the difference, that the organic substance, which is added to the "moler" is made so as to consist of a mixture of cork and sawdust or another finely ground organic substance.

The burned bodies are cooled in the ordinary manner and supply a very good insulating material against both heat and cold.

Having now particularly described and ascertained the nature of my invention I declare that what I claim is:

1. The process of manufacturing insulating bodies, consisting in drying and grinding to powder the silicious rock known as moler; heating organic matter to a degree that will prevent its injurious expansion under further heat; mixing the moler and organic matter together, adding water to the mixture, slowly heating it to about 250° centigrade and finally heating it to burning temperature, whereby the organic matter is consumed.

2. In the process of manufacturing insulating bodies, the mixing of comminuted moler with comminuted organic material which has been previously heated sufficiently to prevent subsequent injurious expansion and the subsequent heating of the mixture to a much higher degree, thereby burning such organic material and giving the resultant bodies a stone-like consistency.

3. The process of manufacturing insulating bodies, consisting in the heating of cork to such a degree as will prevent its injurious expansion under further heating, the mixture of cork so prepared and in comminuted state with comminuted moler and the subsequent heating and burning of the mixture so as to consume the cork and give the residue a porous stone-like consistency.

4. The process of manufacturing insulating bodies, consisting in the heating of cork to such a degree as will prevent its injurious expansion under further heating, the mixture of cork thus treated in comminuted form with comminuted moler and water, the subsequent heating of the mixture to about 250° centigrade and finally the burning of the mixture so as to consume the cork and convert the moler into a porous body of stone-like consistency.

5. The process of manufacturing insulating bodies, consisting in drying and comminuting the silicious rock known as moler, heating cork to a degree which will prevent injurious expansion under further heating, comminuting the cork, mixing it with sawdust or equivalent comminuted organic material cheaper than cork, supplying water to the mixture, baking the same and finally burning it to consume the cork and sawdust and give the remaining moler a stone-like porous consistency.

6. The process of manufacturing insulating bodies, consisting in a preliminary heating of organic matter to a degree which will prevent its injurious expansion under further heating, the mixture of the same in comminuted form with comminuted silicious stony material, and the subjection of the mixture to increased heat sufficient to consume the organic material and convert the remainder of the mixture into a stone-like porous insulating body.

In testimony whereof I have signed my name to this specification in the presence of two subscribing witnesses.

ANDREAS FENGER-GRÖN.

Witnesses:
   MAGNUS YENSEN,
   AGNES HEROLAINS.